May 4, 1954   G. J. WOREL   2,677,557
REPAIR FITTING FOR SOFT METAL THREADED CONNECTIONS
Filed Oct. 12, 1950
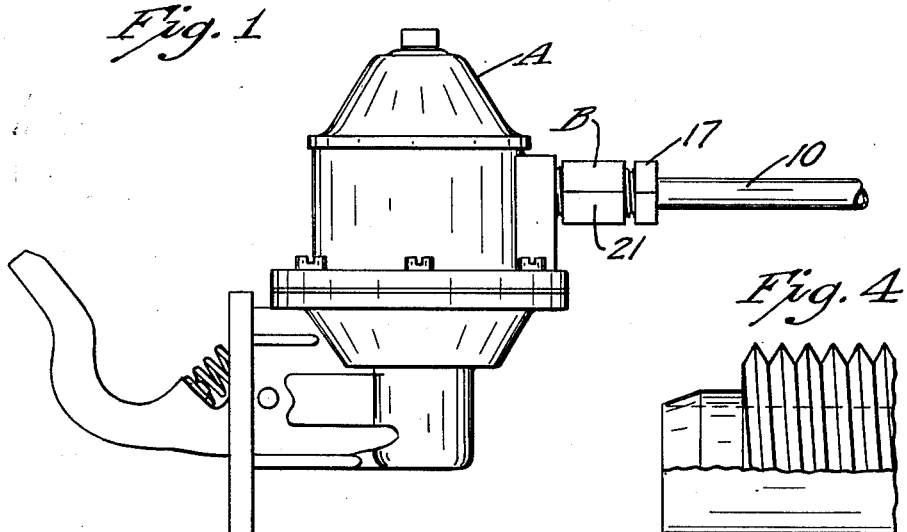
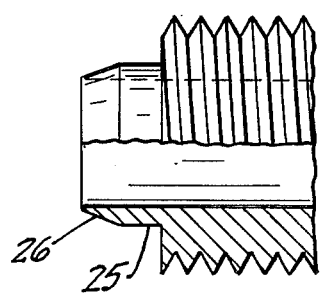
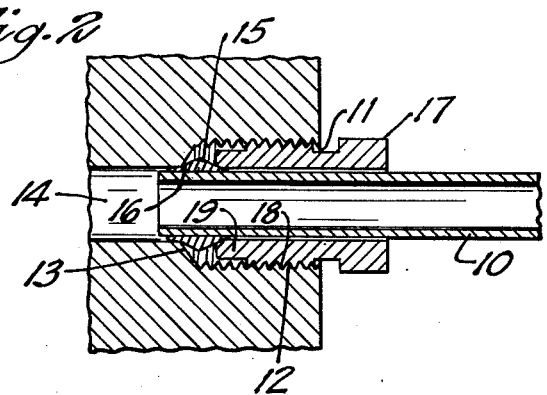
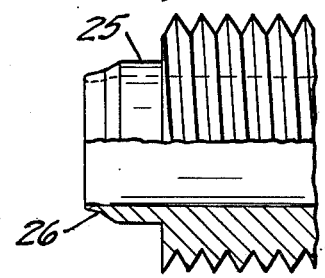
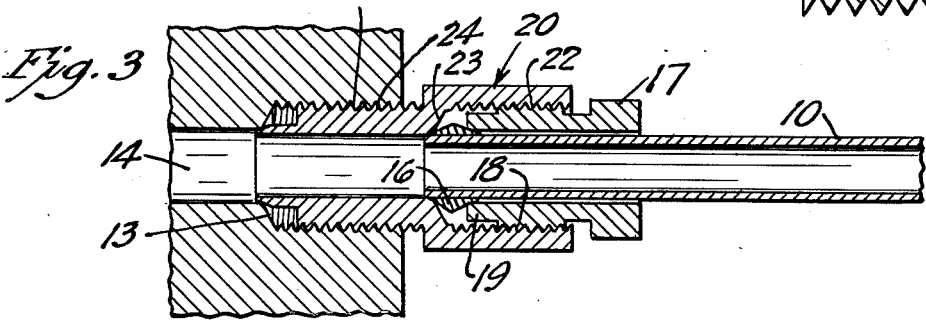
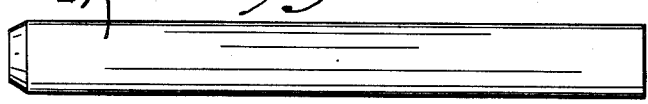
Inventor
Glen J. Worel
By Williamson & Williamson
Attorneys Patented May 4, 1954

2,677,557

UNITED STATES PATENT OFFICE 2,677,557

REPAIR FITTING FOR SOFT METAL THREADED CONNECTIONS

Glen J. Worel, Minneapolis, Minn., assignor to Thexton Manufacturing Company, Minneapolis, Minn., a corporation of Minnesota Application October 12, 1950, Serial No. 189,709

1 Claim. (Cl. 285—166)

This invention relates to repair means for worn and/or damaged threaded soft metal connections.

Extensive use is currently being made of relatively soft metals to form therefrom various operating parts of machines through which it is necessary for fluids to pass. Most frequently these parts are die-cast. The introduction of fluids, such as gasoline, into such parts is most frequently accomplished through the medium of a brass or copper tube leading from a source of fluid and with a shoulder on its end, an internally threaded aperture within such operating part, and a nipple with external threads encircling the tube. The operating part normally has a seat located at the inner end of its threaded aperture to accommodate the shoulder of the tube to form a seal therewith when the nipple is screwed home in the threaded aperture. Since the threads formed in the aperture of the operating part are of soft metal, they quickly become worn and are easily damaged or stripped. Such damage is oftentimes hastened and increased because of the relative inaccessibility of these parts on many machines, thereby increasing the chances for the nipple to be improperly started in the soft metal threads while being returned to proper position after having been removed for repair or inspection of the operating part.

Once these soft metal operating parts have their threads damaged or destroyed, it is common procedure to replace them with new parts and send the old ones back to a factory for recasting even though the aperture almost invariably has additional good threads adjacent to the seat which have not been utilized. These threads have not been used because the shoulder of the tube normally prevents the nipple from progressing inwardly that far. Such a policy is needless and extremely costly. The frequent need for replacement of automobile fuel pumps and carburetors, because of such wear or damage is a glaring example of the waste resulting from such a practice. My invention is directed toward obviating or at least substantially reducing such a practice.

A general object of my invention is to provide a simple and inexpensive means for extending the useful life-span of soft metal members having apertures threadedly connected with other metal members.

A more specific object of my invention is to provide a fitting of cheap and simple construction for the repair of a connection between an externally threaded nipple and an apertured internally threaded member, the latter being formed of soft metal.

A still more specific object is to provide a simple, rigid tubular fitting which may be joined with and inserted between the respective parts of a threaded soft metal conduit connection to utilize otherwise unused threads and thereby effectively repair the connection after its previously used threads have been damaged.

Another object is to provide a repair fitting for a connection between an externally-threaded nipple and an apertured internally threaded member of soft metal which will reform the damaged threads of the soft metal member insofar as possible and which will utilize its inner threads which could not normally be reached and used by the nipple.

A further object is to provide a fitting of the class described having a thin deformable terminal portion capable of conforming to a seat adjacent the threads of the soft metal connection to form a tight seal therewith when the fitting is screwed home in the soft metal member.

These and other objects and advantages of my invention will more fully appear from the following description made in connection with the accompanying drawings wherein like reference characters refer to the same or similar parts throughout the several views and in which:

Figure 1 is a side elevational view of an automobile fuel pump die-cast of soft metal and utilizing one embodiment of my invention in conjunction therewith.

Figure 2 is a fragmentary longitudinal sectional view of a soft metal connection when first assembled, showing in detail the normally unused portion of the threads of the connection.

Figure 3 is a fragmentary longitudinal sectional view of one embodiment of my invention after it has been inserted between the damaged parts of such a soft metal connection as is shown in Figure 2, in order to repair the connection.

Figure 4 is a fragmentary, horizontal, sectional view of the terminal portion of one embodiment of my invention prior to its insertion between the respective parts of such a connection for the repair thereof.

Figure 5 is a fragmentary, horizontal, sectional view of the terminal portion of one embodiment of my invention showing its shape after being inserted between the damaged parts of such a connection for the repair of the same.

Figure 6 is a side elevational view of a small cylindrical guide rod which is utilized in conjunction with the invention to facilitate proper starting thereof within the soft metal member.

Figure 1 shows an automobile fuel pump which has been repaired with one form of my invention. It is typical of the many die-cast operating parts which are formed of soft metal and which have their interior threadedly connected with various types of conduits. As shown in Figure 1, the fuel pump indicated generally as A is connected to a tubular gasoline fuel line 10 by a fitting formed in accordance with my invention and which has been designated generally as B.

As best shown in Figure 2 the soft metal member ordinarily has an aperture 11 formed in its side wall. The walls defining the aperture have threads 12 and a restricted portion at its inner end to form a seat 13. The threads 12 are normally of considerable length and extend to the bottom of the recess or aperture 11 to a point adjacent the seat 13. A conduit 14 communicates with the threaded aperture 11.

The normal complement of such a threaded aperture is the fuel line 10 which has an enlarged terminal portion 15 with a shoulder 16 formed thereon to cooperate with the seat 13 to form a tight seal when pressed together in tight registering relation. Encircling the fuel line 10 there is generally provided a nipple 17 which is externally threaded as at 18 to cooperate with the internal threads 12 of the soft metal member to force the shoulder 16 tightly against the seat 13 to perfect the seal. As best shown in Figure 2, this nipple normally has a non-threaded terminal portion 19 which acts as a guide in starting the nipple 17 properly with respect to the threads 12. Thus it can be readily seen by referring to Figure 2 that a substantial inner portion of the threads 12 cannot be utilized by the nipple 17 and, therefore, have previously been worthless. The security of the soft metal connection depends entirely upon the strength of the threads 12 which cooperate with the threads 18 of limited length on the nipple 17. Because of their soft nature these threads quickly become worn and/or damaged through use or through the removal and reinsertion of the nipple 17 for inspection or repair of the fuel pump.

One embodiment of my invention may include, as shown in Figure 1 and Figure 3, a rigid tubular member 20 which has at least a portion of its outer surface shaped hexagonally as at 21 to facilitate the turning thereof by an ordinary wrench. This tubular member 20 has a tapped portion with internal threads 22 which are adapted to cooperate with the external threads of the nipple 17. As shown, the tapped portion is within the portion which has its exterior surface adapted for turning. The diameter of the tapped portion is reduced at the inner end of the threads 22 to form a seat 23.

This tubular member, or fitting 20 has an externally threaded portion 24 of diameter equal to the diameter of the aperture 11 and with threads of equal depth and pitch with respect to the threads 12 of that aperture. The length of the externally threaded portion 24 is substantially greater than the length of the threads on the nipple 20 and at least as long as the original threads in the fuel pump A. Joining the threaded portion 24 is a terminal portion 25 which has a relatively thin wall and is relatively short in length. The thin wall of this terminal portion 25 is malleable or deformable when subjected to pressure and has an inwardly tapered end 26.

Figure 6 shows a rod 27 which is utilized in guiding the fitting 20 when the latter is started in the aperture 11 so as to engage the threads 12 thereof properly. This rod 27 is of sufficient diameter so as to fit snugly within the conduit 14.

The installation of my fitting is a relatively simple matter. The rod 27 is first inserted into the aperture 11 until it extends into the conduit 14. The fitting 20 is then slid over the outer end of the rod 27 and screwed into the aperture 11. In so doing, the externally threaded portion 24 will tend to reform the damaged threads within the aperture 11 and will eventually engage the previously unused threads 19. At this point the rod 27 is withdrawn to prevent the same from being locked therein when the fitting 20 is screwed home. After the rod 27 has been removed, the fitting 20 is screwed inwardly as far as possible. As it nears the near end of the threads 19, the thin-walled terminal portion 25 will engage the shoulder 16. By screwing the fitting 20 home, the malleable terminal portion 25 will be deformed by the pressure exerted thereby and will assume a shape best shown in Figure 5 to complete a seal with the shoulder 18. The tapered portion 26 will act as a guiding element to insure that the terminal portion 25 will register properly with the shoulder 16.

After the fitting 20 has been installed as described in the preceding paragraph, the nipple 17 and the fuel line 10 are inserted into the tapped portion thereof. The nipple 17 is threaded into the tapped portion so that its threads will cooperate with the threads 22 to draw the enlarged portion 15 of the fuel line tightly against the seat 23 of the fitting 20. The shoulder 16 will cooperate with the seat 23 when the nipple 17 is screwed home to form a tight seal therebetween, whereupon the fuel pump A is repaired for future efficient operation.

The thin deformable terminal portion 25 of the fitting is very important in the successful operation of my invention. It is imperative in repair operations of this type that a highly efficient seal be maintained in all portions of connections within the path of flow of the fluid. Since the terminal portion 25 is malleable its wall will deform readily under the slight pressure exerted as a result of the fitting 20 being screwed home within the aperture 11. This effects a highly efficient seal to insure against leakage therebetween.

It should be noted that the utilization of one of my fittings to repair an operating part such as a fuel pump A will substantially extend the useful life-span of such a part. In fact, the life-span will ordinarily be doubled since the connection which is effected by using this device is just as adequate as the original connection shown in Figure 2. It can be readily seen that I have provided a means for obviating the wasteful practice of recasting an entire operating part because of a damaged thread. This will effect a substantial savings within any industry which utilizes soft metal threaded connections.

It should also be noted that my fitting is simple and easy to install and that a minimum amount of time is required for such installation. In addition, the device is cheap and simple to manufacture.

It will, of course, be understood that various changes may be made in the form, details, arrangement and proportions of the parts without departing from the scope of my invention.

I claim:

For use in repairing a connection between an externally threaded nipple encircling a tubular element having a terminal shoulder thereon and an apertured internally threaded member of soft metal having a reduced seat inwardly disposed from its threaded portion for cooperation with said shoulder and the outer portion of the thread of which member has been damaged; an elongated, rigid tubular fitting having a female internally threaded portion adapted to receive and secure said nipple, a rearwardly and outwardly inclined seat disposed inwardly from said female internally threaded portion and adjacent the inner threads thereof receiving said terminal shoulder and cooperating therewith to form a tight seal when said nipple is screwed home in said female tapped portion, an externally threaded male portion of greater length than the damaged portion of the thread of said member and adapted to be received at least partially by the undamaged thread portion of said member, said externally threaded portion being exactly equal in diameter to the internal diameter of said female internally threaded portion and an abruptly reduced thin-walled non-threaded terminal portion joining said male portion and being readily deformable to conform to said seat and to tightly seal therewith as said fitting is screwed home in said member, said thin-walled terminal portion being generally of slightly larger external diameter than the internal diameter of said seat and having an inwardly tapered free end of lesser external diameter than the internal diameter of said seat to guide said terminal portion into proper position with respect to said seat.

References Cited in the file of this patent

UNITED STATES PATENTS

| Number | Name | Date |
|---|---|---|
| 139,203 | Snow | May 20, 1873 |
| 1,797,277 | Thomas | Mar. 24, 1931 |
| 2,062,407 | Eaton | Dec. 1, 1936 |
| 2,497,274 | Richardson | Feb. 14, 1950 |

FOREIGN PATENTS

| Number | Country | Date |
|---|---|---|
| 883,512 | France | Mar. 29, 1943 |